March 14, 1939.  T. S. SAFFORD  2,150,403
CONTROL DEVICE
Filed Dec. 28, 1934    2 Sheets-Sheet 1

INVENTOR
TRUMAN S. SAFFORD
BY
ATTORNEY

March 14, 1939.　　　T. S. SAFFORD　　　2,150,403
CONTROL DEVICE
Filed Dec. 28, 1934　　　2 Sheets-Sheet 2
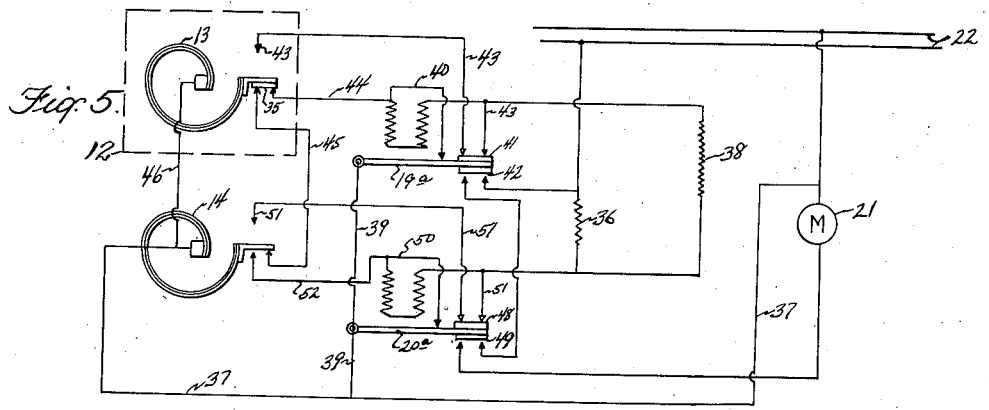
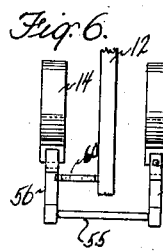
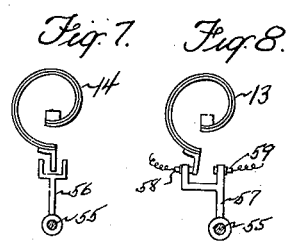
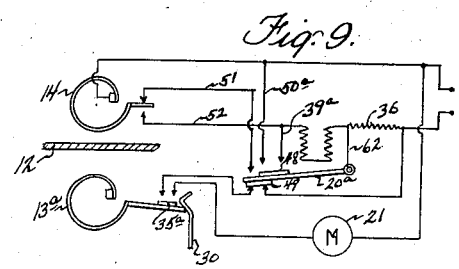
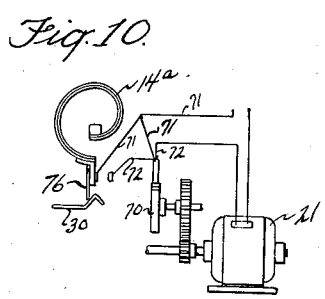
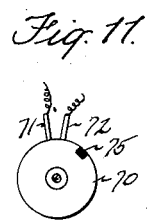
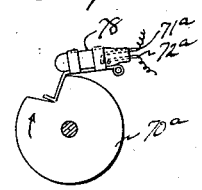
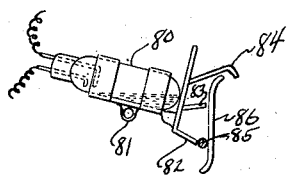
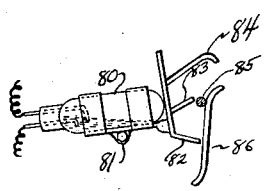
INVENTOR
TRUMAN S. SAFFORD.
BY
ATTORNEY Patented Mar. 14, 1939

2,150,403

UNITED STATES PATENT OFFICE 2,150,403

CONTROL DEVICE

Truman S. Safford, Riverside, Conn.

Application December 28, 1934, Serial No. 759,455

15 Claims. (Cl. 62—4)

This invention relates to a device for automatically regulating the operation of refrigeration apparatus so as to prevent the excessive accumulation of frost deposits thereon. More particularly the invention relates to thermostatic devices responsive to conditions of frosting and use.

The problem of defrosting refrigerators is one which has received a great deal of attention; and, especially in the use of household refrigerators, it has become common practice to provide a convenient switch for interrupting the operation of the refrigerating device so as to permit the melting of accumulated frost. Certain devices for this purpose have been widely advertised as "automatic defrosters", but in fact are automatic only in so far as they restore the normal operation of the device after the defrosting is complete. Certain devices have also been suggested for automatically initiating defrosting, but these have not been adopted, and it has commonly been supposed that fully automatic defrosting was impracticable because it is highly objectionable to have the defrosting period occur at a time when rapid freezing of ice cubes or desserts is desired.

In my prior application Serial No. 618,220, filed June 20, 1932, I have disclosed a fully automatic defrosting device which is designed to avoid any interference with the use of the refrigerator.

The objects of my present invention are similar to those of my said prior application, and I have now found that these objects may be attained within the broad scope of, but in ways and by devices superior in any respects to those specifically disclosed in my prior application.

The present application is a continuation in part of my said prior application and I am claiming herein the broad invention of which different specific embodiments are disclosed in this and my said prior application.

In the accompanying drawings I have shown a preferred embodiment of my invention and a number of modifications thereof. These drawings are not intended to be exhaustive and are not to be taken as limiting of the invention, but on the contrary, are chosen with a view to illustrating my invention and explaining the principles involved therein so that others skilled in the art may apply it under varying conditions of practical use and may make such modifications and changes therein as such conditions may make desirable.

Figure 1:
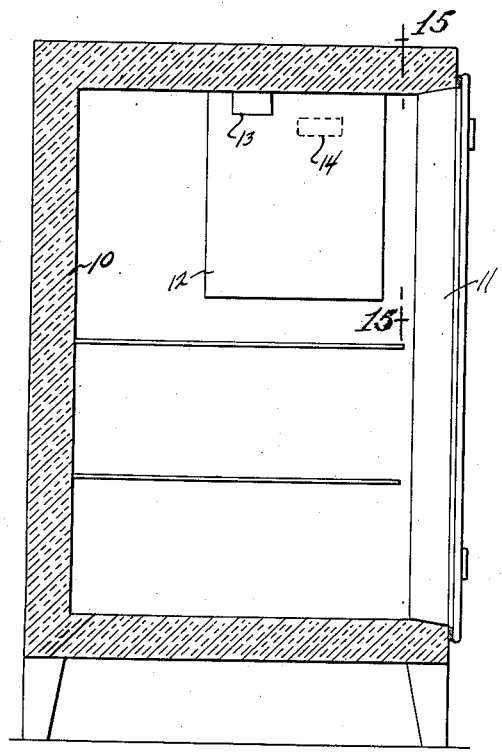

In these drawings I have shown in:

Figure 1, in vertical section, of a domestic refrigerator with the cooling unit and thermostatic devices diagrammatically represented to indicate the position of these units in the preferred embodiment of my invention.

Figure 2:
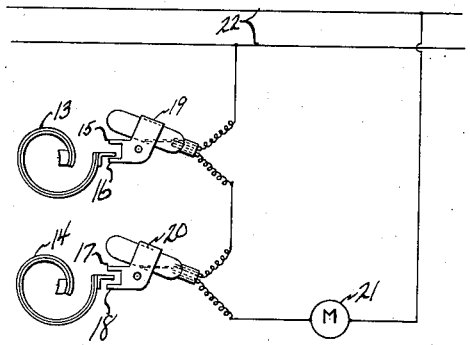

Figure 2, a diagram of the circuit by which the refrigeration is controlled in the preferred embodiment of my invention.

Figure 3:
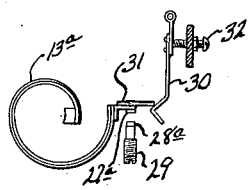

Figure 3, in axial section, another type of thermostatic circuit controlling device which may be substituted for the particular type shown in the other figures.

Figures 4, 15:
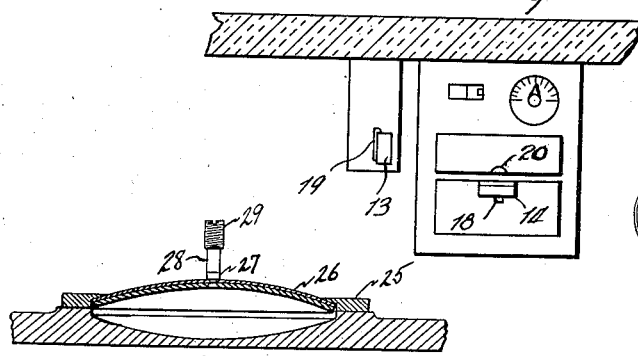

Figure 4, in elevation, another type of circuit controlling device.

Figure 5, a diagram of another embodiment of my invention.

Figure 6, in elevation, a modification in which two thermostats are mechanically instead of electrically interconnected.

Figures 7 and 8, side views respectively of the two thermostats shown in Figure 6.

Figure 9, a diagram of another embodiment which employs a snap thermostat switch on one side with the thermostat and electrical relay on the other side.

Figure 10, a diagrammatic view of another embodiment defining a snap thermostat switch with a mechanical delay device.

Figure 11, an end view of the electrical connection for the mechanical delay of Figure 10.

Figure 12, a view similar to Figure 11 showing a modified delay device, and

Figures 13 and 14, a modified thermostatic circuit control showing respectively the "off" and "on" positions.

Fig. 15 is a fragmentary sectional view taken on line 15—15 of Fig. 1.

Referring first to Figure 1, it may be stated generally that my invention contemplates the use of a thermostat positioned within the freezing chamber of the cooling unit, (as for example the chamber commonly provided for the freezing of ice cubes, desserts, etc., in household refrigerating units) which thermostat in response to a temperature indicative of the presence of unfrozen liquids will terminate defrosting, and secondly, the provision of a device which is responsive to a decrease in thermal conductivity of the cooling surfaces which device shall automatically initiate defrosting. In some cases the two devices may be identified, whereas in other cases they may be separate. Ordinarily, however, for sake of economy it is desirable that both functions should be performed by the same thermostatic devices.

In Figure 1, I have shown diagrammatically the relationship of two thermostatic devices adapted to serve these functions. At 10, I have indicated the box of a domestic refrigerator; at 11, the door by which access is had to the interior of the box; at 12, the cooling unit or evaporator; at 13, a thermostatic device outside of the evaporator, but sensitive to the temperature of the air cooled thereby, and at 14, by a broken line I have indicated a thermostatic device on the interior of the chamber within the cooling unit and positioned so as to be sensitive to the temperature of liquids which may be placed therein for freezing, and to the temperature of the atmosphere in said chamber, but preferably insulated from direct heat-exchanging with the cooling surfaces of the chamber. Thus it may be just above the ice trays, or in a recess in a shelf on which such tray is held or at the end of the ice tray space in close association with the ends of the trays.

These thermostats, 13 and 14, may be of various types, and in the drawings I have shown several types merely for the purpose of illustration, understanding of course that the choice may be from numerous others upon considerations well understood in the art.

In Figure 2, I have illustrated diagrammatically the thermostats 13 and 14 as bi-metallic spiral strips each adapted to engage respectively the fingers 15—16 and 17—18 of the tilting switches 19 and 20, e. g., mercury switches.

These switches, 19 and 20, are, as shown in Figure 2, connected in series with each other and with the motor 21 from the power line 22.

Each switch is balanced so that it will stay in either position to which it is moved. The flow of mercury to one side or the other of the pivot serving to hold it there until the switch is again tilted.

The thermostat 13 is adapted to move the finger 15 when the upper temperature limit of the range permitted within the box 10 adjacent the cooling unit 12 has been attained, and to move the fingers 16 to tilt the switch in the opposite direction when the lower limit of that range is attained. In order that this thermostat may serve to maintain a more or less constant temperature in the atmosphere throughout the box and not be too sensitive to the operation of the cooling unit, the thermostat 13 should be placed at a substantial distance from the cooling surface or shielded therefrom so as to be effected more by convection than by direct radiation.

The thermostat 14 is set so that, at a temperature below that ordinarily attained in the freezing chamber when the cooling unit is free from frost, it contacts and moves the finger 18 to open the switch 20, whereas at a temperature which is indicative of the presence of unfrozen liquids within the chamber, or of completion of defrosting, it will contact and move the finger 17 to the closed circuit position.

In the operation of this device we may assume by way of example that a temperature is to be maintained at the thermostat 13 between the range of 40° and 50° F. and that in the normal operation of the refrigerating device, the interior of the freezing chamber at the thermostat 14 will not drop below 20° F. We may assume a temperature of 30° F. as one indicative of unfrozen liquids. This temperature is also chosen so as to be indicative of the completion of defrosting on the outside of the cooling surfaces. Since the thermostat 14 is placed at the coolest part of the cooling unit, except when unfrozen liquids are positioned therein, and is ordinarily exposed to the temperature of the frozen materials within the freezing chamber, a setting at a temperature somewhat below the actual freezing point is ordinarily preferable.

Assuming that the cooling unit is operating without frost, the thermostat 14 will be in the "on" position as shown in Figure 2, and the thermostat 13 also will be in the position shown in Figure 2. As the box is cooled to the lower limit of its intended operating range, the thermostat 13 will contact with and move the finger 16 and tilt the switch 19 to its "off" position, thereby stopping the motor 21 and interrupting refrigeration. As the air in the box becomes warm the thermostat 13 will move towards finger 15 and as the upper limit of the temperature range is reached the finger 15 will be moved until the switch 19 is tilted to its "on" position, the motor 21 will then be started and the refrigerating cycle repeated.

This temperature control by the thermostat 13 will continue repeatedly until frost has accumulated on the cooling surfaces to such an extent that the interior or freezing chamber at the thermostat 14 is cooled below its normal low limit before the thermostat 13 reaches its low limit, whereupon the thermostat 14 will contact the finger 18 and move the switch 20 to its "off" position.

With the circuit broken at the switch 20, the operation of the motor will not be restored if the upper limit of the normal temperature range is reached in the box 10, but only when one of two conditions have occurred: Either when the frost is completely melted from the cooling unit so that the temperature within the unit at the thermostat 14 is raised to the upper limit and the finger 17 is contacted and moved to the "on" position, or when unfrozen liquids are placed in the freezing chamber so that their heat is transmitted to the thermostat 14 and the latter is operated to close the switch 20.

Assuming that the refrigerating device is one which attains the coldest temperature in the cooling unit, while the motor is operating, the switch 19 will always be "on" when the switch 20 is "off" since the opening of the switch 19 would cause a reversal of the temperature change, and consequently would prevent the opening of the switch 20. Consequently, if at any time during the defrosting period, any material which is to be frozen is put into the freezing chamber so as to raise the temperature of the thermostat 14, the motor circuit will be closed and freezing will begin immediately. So long as freezing is not required, however, the defrosting will continue until it is completed.

Notwithstanding this interruption of refrigeration, there is no serious danger of spoilage of materials within the box if it is designed with adequate cooling surface on the cooling unit 12, since at all times during the defrosting period, there will be melting ice on these surfaces giving continued refrigeration.

In Figure 3 I have illustrated another type of thermostatic switch which may be used instead of those shown in Figure 2. In this case a thermostatic element consisting of a confining ring 25, and a bi-metallic disk 26 carries an electrical contact 27 which is to cooperate with the adjustable contact 28 positioned on the ends of the adjustable screw 29. The screw 29 may be secured in any convenient support not shown and the contacts 27 and 28 may be connected into the circuit as shown in Figure 2 or into other circuits, e. g., as described below and shown in the following figures.

In the operation of this device, the confining action of the periphery of the disk itself and of the ring 25 serves to prevent a uniform movement of the contact 27 away from the contact 28, but may be designed substantially to hold the contact between them until sufficient stress is accumulated by the difference in expansion between the two layers of metal disks to snap the disks to an opposite curvature. For purposes of illustration, the curvature of the disk is exaggerated in this figure of the drawings, and ordinarily the contacts 28 and 27 should be placed so that there is just enough curvature in the disk 26 to assure this snap action and prevent a continuous movement of the contacts, such as would be liable to draw an arc between them.

In Figure 4 another type of thermostat for the same purpose is shown. In this case a spiral bimetallic strip substantially the same as that shown at 13 and 14 in Figure 2 is used, but in this case instead of the mercury switches 19 and 20, a direct contact 27a and 28a is used and in order to prevent arcing by a slow separation of the contact points, the spring detent 30 is used with a cam ridge such that the extension 31 on the thermostat will hold the contact 27a against movement until enough force has been accumulated to snap the extension 31 over the ridge on the spring 30. An adjusting screw 32 may be provided to regulate the tension on the spring 30.

In Figure 5 I have shown another embodiment of my invention which is more especially adapted for use with refrigerating devices which have a carry over such that the coldest temperature in the box may occur after the refrigerating motor has been stopped.

In principle this device is the same as that of Figure 2, but electrical relays and circuits are used instead of mechanical features.

In this case the thermostats 13 and 14 may be substantially the same as those illustrated in Figure 2 except that in this case they serve as conducting members making contact as will be hereinafter described, and the thermostat 13 also carries a contact 35 insulated from the thermostat itself.

The circuit connecting the motor 21 to the power line 22 is in this case controlled by the relays 19a and 20a operating in series in the same way that the switches 19 and 20 operated in the embodiment illustrated in Figure 2. These relays in turn are controlled from the thermostats 13 and 14.

The relay circuits are energized from the line or from any other suitable current source through the connections 36 and 37, the former in this instance having a resistance or other suitable means for decreasing the voltage and limiting the current flow in the control circuit.

The relay 19a is energized through a second resistance 38 which serves to isolate its circuit from that of the relay 20a so that it may be shorted, to drop its armature, without shorting the relay 20a.

The armature of the relay 19a is connected to the return connection 37 as shown at 39 and makes contact directly to a self-energizing shunt 40 by which the relay is held up even after the circuit is open at the thermostat contact 35. The armature 19a also carries contacts 41 and 42 insulated from the armature. The lower contact 42 closes the motor circuit, as already described, when the relay is open and the contact 41 closes the short-circuit 43 to the thermostat 13 when the relay is energized.

The relay circuit is completed through the connections 44 and 45, the contact 35, the thermostat 14 and the return connection 37. The short-circuit 43 is completed through the thermostat 13, the connection 46 and the return connection 37.

The relay 20a, like the relay 19a carries two insulated contacts 48 and 49, is itself connected through the connection 39 to the return connection 37 and makes contact directly with the self-energizing or locking connection 50.

The lower contact 49, like the corresponding contact 42 of the relay 19a, controls the circuit of the motor 21 while the upper contact 48, like the corresponding contact 41, of the relay 19a, controls the short-circuit connection 51 by which both relays are shorted through the thermostat 14 and the return connection 37.

The circuit of the relay 20a is completed through the connection 52, the thermostat 14 and the return connection 37. The contacts of the connection 45 at the relays 13 and 14 respectively may be made adjustable and in particular, the adjustment of the contact at the thermostat 14 may serve as the "cold control".

The contact of 45 with the thermostat 14 should, also, be resiliently mounted so that, upon further cooling of the thermostat, it can yield to permit contact with the connection 52.

In the operation of this device, assuming that the refrigerator is operating normally without frost on the cooling unit, the armatures of both relays will be dropped and the motor circuit closed through the contacts 42 and 49. When the normal low limit is reached in the box 10 at the thermostat 13, the contact 35 will close the circuit of the relay 19a between the connections 44 and 45, and if the desired freezing temperature has been reached in the cooling chamber, this circuit will be completed through the thermostat 14 and the return connection 37.

Unless there is unfrozen liquid in the freezing chamber this circuit will be closed at 14 before it is closed at 13 and the normal control therefore will be by the thermostat 13.

When its circuit is thus completed the relay 19a is energized and the motor circuit broken at 42. Refrigeration is therefore terminated until the high limit temperature is reached at either thermostat. Assuming that the thermostat 13 is the first to reach its high limit, it will contact with the connection 43 and short-circuit the relay 19a dropping its armature and closing the motor circuit at 42. While the thermostat 13 is moving between the contacts 44—45 and 43, that is to say, is between its two limits, the relay 19a is energized through the locking shunt 40, the armature 19a and the connection 39.

So long as the cooling unit remains free from frost and no warm liquids are put into the freezing chamber, the operation of the device will continue under the control of the thermostat 13, substantially as described, with intermittent operation of the motor as required. If, however, while the motor is "off", i. e., while the relay 19a is energized, a liquid should be put into the freezing chamber for freezing, the thermostat 14 would make contact with the connection 51 and thereby would short the entire circuit from the resistance 36 to the return connection 37, thus dropping both the relays 19a and 20a, and immediately starting the motor 21. The operation of the motor would then continue only until the liquid thus placed in the freezing chamber was frozen sufficiently so that the thermostat 14 was moved from the connection 51 to the connection 45, (assuming, of course, that the box also at that time had been cooled to such an extent that the contact 35 had closed the connection 44 to the connection 45). If the box should not have been cooled to the temperature at which the contact 35 closes the circuit between 44 and 45, refrigeration would, of course, continue until this occurred.

As the frost gradually accumulates on the surface of the cooling unit, the temperature within the freezing chamber when the low limit of temperature is reached in the box, will become progressively lower in each successive cycle until a defrosting limit is reached substantially below that at which contact is made with the connection 45 at the thermostat 14. At this point, the thermostat 14 contacts the connection 52 through which the relay 20a is energized. The motor circuit is opened thereby at 49; and the relay 20a is locked up through the connection 50. Thus a defrosting period is begun.

In Figures 6 to 8, I have illustrated another embodiment of my invention in which the inner and outer thermostats 14 and 13 respectively are mechanically instead of electrically interconnected by means of the rock shaft 55 and the arms 56 and 57. One of the thermostats by engaging the arm 56 shifts the contacts on the arm 57 relative to the other. With this arrangement, either one of the thermostats is reversed with respect to the other, or they are made with the bi-metallic strips reversed, so that they move in opposite directions with a given change in temperature.

A spring detent 60 holds the rock shaft in either position.

The control circuit may be substantially the same as that shown for the relay 14 in Figure 9, except that there need be no break in the motor circuit at 35a. If a snap switch, e. g., such as those shown in Figures 3 and 4, is used, a single contact 58 may be used to complete the motor circuit directly omitting the second contact 59 and the relay circuit.

Referring particularly to Figures 7 and 8, the normal control of refrigeration will be by the thermostat 13 making contact at 58 and 59 respectively when the upper and lower limits of normal operation are attained in the box 10.

When the temperature within the freezing chamber reaches a low limit indicative of excessive frost, the thermostat 14 will move the arm 56 and thereby shift the contacts 58 and 59 so that the motor will not be turned on when the normal upper limit is reached. The spring 60 holds the arm 56 in this position to which it has been moved by the thermostat 14, and thus the defrosting period, initiated when the arm 56 is moved to the left, will be completed only when the temperature in the freezing chambers has risen to a point indicative of completion of defrosting or insertion of a material to be frozen at which time the thermostat 14 will move the arm 56 back to the normal position. Thereafter the normal refrigerating cycle will again control.

In the embodiment shown in Figure 9 the relay 19a associated with the thermostat 13 has been replaced by a snap switch similar to that illustrated in Figure 4 while a defrosting relay 20a is still provided.

The circuit of the motor 21 in this case is controlled through the contact member 49 on the relay 20a and the contact member 35a on the thermostat 13a.

The circuit of the relay 20a is closed through the thermostat 13 when at its defrosting limit by the connection 52a and is short-circuited at its high temperature limit through the connection 51, the armature of the relay and the connection 52. During the defrosting period the relay 20a is locked up by the self-energizing connection 50a—39a connected through the insulated contact 48 on the armature of the relay 20a.

In the operation of this device the normal control is by the snap thermostat switch 13a controlled by the spring detent 30, but once the low temperature limit indicative of frost insulation is reached within the freezing chamber, the motor circuit is opened at the relay 20a and a defrosting period is initiated which continues until the high temperature limit indicative of complete defrosting or insertion of a material to be frozen is reached.

With this device the insertion of material to be frozen does not invariably start the refrigerating device, as it does in the embodiment of Figure 5, but as in all present commercial refrigerators, freezing must await the operation of the outside control 13a. If immediate starting is desired, this can easily be attained by use of a resistance heater associated with the thermostat 13a and forming a part of the connection 51, so that when the upper limit is reached in the freezing chamber the operation of the thermostat 13a will be artificially stimulated.

In all of the examples illustrated and described so far, the accumulation and removal of frost is determined by a direct measurement of the transfer capacity of the cooling surfaces under given cooling conditions by means of thermostats placed within and without. The outer thermostat represents the usual temperature control and although shown as a specific type and in a specific circuit relationship, it is to be understood that any thermostatic controls of the refrigeration such as have been commonly used heretofore can serve as this outer thermostat, the inner thermostat then serving to render the refrigeration device inoperative after the low temperature limit has been reached within the freezing chamber and until the high temperature limit has been reached.

It is also possible to use the inner control as the sole thermostatic control of the refrigeration. This I have illustrated for example in Figures 10 to 12. In this case the thermostat 14 is adapted to close the motor circuit at a temperature within the freezing chamber which under normal operating conditions is indicative of the desired temperature in the box 10. Once the motor 21 is started it rotates the commutator 70 shown in Figures 11 and 12 so that by the time the temperature within the freezing chamber is sufficiently reduced by the operation of the refrigerating device to separate the contact of the thermostat 14a, the brushes 71 and 72 are on a conducting portion of the commutator 70 and the motor circuit therefore remains closed through this parallel connection 72—70—71.

The commutator 70 is geared to the motor at such ratio that one revolution will normally suffice for lowering the temperature within the box from the normal high limit to the normal low limit when there is no excessive frost accumulation, and will suffice to lower the temperature to the defrosting limit when more than the maximum permitted frost is on the cooling surface.

In the operation of this device, the normal refrigeration is turned on by the closing of the contact upon movement of the thermostat 14a to the right and is turned off, after the contacts of the thermostat 14a have been separated by the completion of a revolution of the commutator 70 so as to bring its insulating portion 74 under one of the brushes. Normally the extension 76 oscillates in front of the ridge on the detent 30. If, however, the cooling surfaces have been so far insulated by frost as to cause an excessive decrease in temperature during the revolution of the commutator 70, the extension 76 on the thermostat 14a will have passed over the cam ridge on the spring detent 30 with the result that the thermostat 14a will be held out of contact with the connection 72 until a high temperature has been reached corresponding to completion of defrosting or insertion of material to be frozen.

The commutator 70 driven by the motor 21 is in this case representative of a time delay device which assures the operation of the refrigerating device for a period after it is started which is sufficient to produce the desired reduction in temperature under normal operating conditions without frost and to produce an excessive reduction of temperature sufficient to shift the thermostat to its defrosting condition when a given amount of frost has accumulated.

Figure 12 illustrates a modification of the same type of control except that instead of a commutator 70 a cam 70a is provided which operates the tilting switch 78 to close the circuit between the connections 71a and 72a.

The device illustrated in Figures 10 to 12 is most closely related to those specific embodiments of my broad invention which were disclosed in my prior application Serial No. 618,220, the thermostat 14a in this case being responsive to the use of the refrigerator instead of the door operated device, and the motor drive commutator replacing the flow or clockwork delay mechanism. As will be readily understood, the thermostat may be replaced by other delay initiating means, e. g., as those disclosed in my said prior application or the delay means may be replaced by others, e. g., such flow or clockwork devices as are disclosed in my said prior application.

In Figures 13 and 14 I have illustrated another embodiment of my invention in which a single thermostat within the freezing chamber is utilized. The same assumptions as to the temperature within the box 10 are made as in the case illustrated in Figures 10 and 12.

In this case a mercury switch 80 is mounted on a carriage pivoted at 81 and having projections 82, 83 and 84 adapted to contact with the end 85 of a thermostat which is shown only in cross section at 85. An S-guide 86 holds the thermostat end 85 in or away from the path of the projections 82 and 83. In the normal operation of this device, the thermostat normally operates within the range between the projections 82 and 83, moving first one and then the other to tilt the switch to "on" and "off" positions respectively. If, however, the temperature within the freezing chamber should become sufficiently cold to permit the end 85 of the thermostat to slip over the lower end of the S-guide 86, then the thermostat would have to be warmed to a temperature sufficiently high to allow it to pass over the upper end of the end guide 86 and push the projection 84 to the "on" position before the refrigerating device could again operate. The temperature at which it may thus pass over the upper end of the S-guide 86 and move the projection 84 is ordinarily chosen as that which is indicative of completion of defrosting or insertion of materials to be frozen. Since the thermostat end 84 is retarded and deflected by the curved end of the S-guide, the thermostat tends to snap the projection 84 on the switch carriage immediately to the "on" position as soon as it is released from the guide 86. Upon further cooling from this temperature due to the renewed operation of the refrigerating device, the end 85 passes along the left hand side of the S-guide and again contacts with the projections 82 and 83 to maintain the normal temperature range.

This control may be used in place of the thermostat 14a shown in Figure 10 or with any other suitable delay device, but is particularly adapted for use with a refrigerating device which has a substantial carry-over so as to serve as its own delay device. For example, a device which accumulates a substantial supply of condensed refrigerant during its operating period which continues to evaporate after the operating period and thereby to cool still further the interior of the freezing chamber after the refrigerating circuit is opened. It is particularly satisfactory where it is combined with a thermostatic valve responsive to temperature within the box 10 which controls the admission of refrigerant to the cooling unit so that up to the extent of the refrigerant supply accumulated during operation of the refrigerating device, the refrigeration may continue after the opening of the switch 80 so long as the temperature within the box 10 is above the normal low limit.

From the above description and accompanying drawings, it will have become apparent to those skilled in the art that my invention may be embodied in a wide variety of apparatus of which the specific examples given are only a few. For purposes of illustration I have used the simpler case in which a motor is controlled directly as in the case of domestic electric refrigerators. It will be understood, however, that the device which I have indicated diagrammatically at 21 and referred to as a motor may be any type of refrigeration control, as for example, an electrically controlled valve or a relay or any other type of electric referigerating device, whether operated by a motor or not, and any other type of electric control for a refrigerating device, whether the latter is operated by electricity or not.

In a broad aspect the invention contemplates the combination of means responsive to frost accumulation with means responsive to use of the freezing chamber, the latter being the dominant control so that although defrosting periods will be automatically initiated when the accumulation of frost demands, nevertheless, the defrosting will always be put off whenever the freezing chamber is in use. As above disclosed I have provided a simple and economical means for accomplishing this combination by using a thermostat within the freezing chamber to determine the use of the chamber by response to temperatures of unfrozen materials inserted therein and to determine or assist in determining the accumulation and removal of frost by the heat transfer through the wall of the chamber, reliance being had upon the fact that with accumulation of frost the outer wall of the cooling unit will be insulated so that the refrigerant therein will produce a greater cooling effect upon the interior of the freezing chamber. This is especially true in refrigerating devices which supply to the cooling unit a limited flow of refrigerant less than would reduce the entire cooling unit to its evaporating temperature, or in which the pressure within the evaporator (and consequently the temperature of evaporation) is reduced by the refrigerationg device when the rate of evaporation is reduced. Accordingly, I prefer to use refrigerating devices of these types.

Although I have referred in the above specifically to the shutting off of refrigeration during the defrosting periods, it will be understood by those skilled in the art that a defrosting cycle may be initiated instead which is designed to maintain a higher than normal temperature, but below some given limit so that if the temperature in the box should exceed that limit, refrigeration might be resumed for a short period after which defrosting would continue. These and numerous other changes are within the scope of my present invention.

In the accompanying claims I have used the term "power refrigeration" and variants thereof to refer to refrigerators in which cooling is effected by conversion of energy whether mechanical, electrical, thermal or chemical, etc., rather than by simple absorption of heat by melting of ice.

What I claim is:

1. The combination of a refrigerator including a box and a power refrigerating device having a chilling unit positioned within the box to cool the atmosphere thereof and having a refrigerant therein and said chilling unit having a receptacle within which a freezing temperature is to be maintained, with a control for said refrigerating device including defrosting means adapted to render said device temporarily inoperative while frost is melted from the chilling unit, and means responsive to temperature within said receptacle to prevent interruption of refrigeration by the defrosting means while the temperature within said receptacle is above a predetermined temperature limit, said temperature responsive means being in more intimate heat-exchange relation to the interior of said receptacle than to the refrigerant.

2. The combination of a refrigerator including a box and a power refrigerating device having a chilling unit positioned within the box to cool the atmosphere thereof and said chilling unit having a receptacle within which a freezing temperature is to be maintained, with a control for said refrigerating device comprising defrosting means adapted to render said device temporarily inoperative while frost is melted from the chilling unit, and means responsive to the placing in said receptacle of material to be frozen and adapted to set the refrigerating device for operation to freeze liquids in said receptacle and adapted to render said defrosting means ineffective to interrupt refrigeration while it is thus set for freezing.

3. A refrigerator, including a box and a power refrigerating device having a chilling unit positioned within the box to cool the atmosphere thereof and having a refrigerant therein, and said chilling unit having a receptacle within which a freezing temperature is to be maintained, and defrosting control means adapted to interrupt operation of the refrigerating device to effect defrosting of the chilling unit, which is characterized by temperature-responsive means in more intimate heat-exchange relation to the inside of said receptacle than to the refrigerant and adapted, regardless of the defrosting control means, to preclude the interruption of operation of the refrigerating device when, but only when, the temperature within said receptacle is above a predetermined temperature limit.

4. In a control device for a refrigerator having a heat absorbing unit with a refrigerant therein and a receptacle in said heat absorbing unit adapted for freezing liquids, the combination therewith of means responsive to temperatures created by said heat absorbing unit and adapted normally to regulate the flow of refrigerant within the heat absorbing unit to maintain said temperatures within a limited range; means for initiating a defrosting cycle, and means responsive to the temperature within said receptacle, and in more intimate heat-exchange relation to the inside of said receptacle than to the refrigerant, adapted to terminate the defrosting cycle when the temperature within said receptacle is as high as a predetermined high temperature limit near the freezing point.

5. The combination as defined in claim 4 in which the means for initiating the defrosting cycle is a temperature responsive device responsive to a predetermined extraordinarily low temperature in the receptacle.

6. The combination as defined in claim 4 in which the means for normal regulation, the means for initiating a defrosting cycle and means for terminating the defrosting cycle all include a common temperature responsive device responsive to temperature within said receptacle.

7. In a refrigerator having a power refrigerating device with a heat absorbing unit, an automatic control device comprising circuit control means responsive to temperatures within said unit and adapted in response to a predetermined high temperature limit therein to initiate operation of the power refrigerating device, means to delay termination of such operation for a substantial period after initiating, and means adapted at a predetermined low temperature within said unit which is indicative of frosting to prevent subsequent initiation of operation of the refrigerating device until a predetermined high temperature limit is reached indicative of completion of defrosting or the presence of a warm material requiring cooling.

8. The combination as defined in claim 7 in which the power refrigeration device comprises an electric motor, the means for determining the period of operation is a switch in a circuit adapted to energize the motor and means operated by said motor to close said switch upon its initial operation and to open it after a predetermined operation.

9. In a control for a motor driven refrigerating device, thermostatic means adapted to close the motor circuit at a predetermined high temperature and a switch closed by initial operation of the motor to maintain its circuit energized for a substantial period of operation and opened after a predetermined operation, and defrosting means adapted to open the motor circuit for a defrosting cycle only after said predetermined operation.

10. The combination of a refrigerator having an artificial refrigerating device comprising a cooling unit, a thermostat within the cooling unit, a second thermostat outside the cooling unit in the space cooled thereby, means associated with said thermostats adapted normally to initiate refrigeration when the temperature of either thermostat reaches its predetermined high limit and to interrupt refrigeration when the temperature of each has reached a predetermined normal low limit, and to initiate a defrosting cycle when the temperature of the inner thermostat reaches a sub-normal low temperature limit before the outer thermostat has reached its normal low temperature limit.

11. The combination of a power refrigerating device controlled by an electrical circuit and having a cooling unit, a thermostat within the cooling unit, a second thermostat outside the cooling unit in the space cooled thereby and electrical switch means associated with each of said thermostats adapted to condition said circuit to initiate refrigeration when both thermostats have reached their predetermined upper limits and to interrupt refrigeration after either thermostat has reached its predetermined lower limit until it has again reached its upper limit, the limits of the inner thermostat being respectively above and below the temperatures normally reached within the unit when the outer thermostat reaches its upper and lower limits and the upper limit being a temperature reached within the unit when its surface is at a temperature assuring the melting of frost therefrom.

12. The combination as defined in claim 11 in which the cooling unit is in the form of a cabinet having a compartment within it for reception of ice trays, the inner thermostat is in such close heat-exchange relation to said ice tray compartment and its high limit is such that refrigeration will continue so long as the trays in said compartment remain substantially above a freezing temperature.

13. The combination of a refrigerator having an artificial refrigerating device comprising a cooling unit with a control device comprising a thermostat within the cooling unit, a thermostat within the cooled space outside the cooling unit, a circuit controlling the refrigeration by said device and having contacts adapted to break the circuit at either of two points, a relay adapted to close and open said circuit at one of said points, parallel connections in the energizing circuit of the relay, one open at the inner thermostat, but closed thereby when the latter reaches a sub-normal temperature indicative of frost accumulation and the other open at said relay but closed thereby when it is energized, a shunt connection around said relay open at said inner thermostat until the latter reaches a temperature indicative of completion of defrosting and closed thereby at such temperature, a second relay adapted to close and open said refrigeration controlling circuit at the other of said points, parallel connections in the energizing circuit of said relay, one open at both thermostats but closed at each when its temperature reaches a normal low temperature limit, and the other open at said relay but closed thereby when it is energized, a shunt connection around said relay open at said outer thermostat until the latter reaches a normal high temperature limit and closed thereby at such temperature, and a resistance in the circuit through said last-named shunt whereby the closing of the last-named shunt circuit will release the second-named relay but not the first, whereas the closing of the first-named shunt circuit will release both relays, said relay connections being parallel but connected to a common source of electromotive force.

14. The combination as defined in claim 4, in which the means for initiating defrosting comprises means operative in response to a predetermined extraordinarily low temperature in the remined receptacle to render means for normal regulation inoperative to regulate the refrigerating device for further cooling until the means for terminating the defrosting cycle has been operated.

15. The combination of a refrigerator having an artificial refrigerating device comprising a cooling unit, means responsive to temperature within the cooling unit, means responsive to temperatures outside the cooling unit in the space cooled thereby, means associated with said temperature responsive means adapted normally to initiate refrigeration when the temperature affecting either temperature responsive means reaches a predetermined high temperature limit respectively and to interrupt refrigeration when the temperature affecting the first named temperature responsive means reaches a predetermined extraordinarily low temperature limit before the temperature affecting the second named temperature responsive means has reached a predetermined normal low temperature limit.

TRUMAN S. SAFFORD.